United States Patent [19]

Harding

[11] Patent Number: 5,208,993
[45] Date of Patent: May 11, 1993

[54] TOUCH PROBE

[75] Inventor: Andrew J. Harding, Almondsbury, United Kingdom

[73] Assignee: Renishaw Metrology Limited, Gloucestershire, United Kingdom

[21] Appl. No.: 854,004

[22] Filed: Mar. 19, 1992

[30] Foreign Application Priority Data

Mar. 28, 1991 [GB] United Kingdom ............... 9106731

[51] Int. Cl.$^5$ ............................................. G01B 5/20
[52] U.S. Cl. ...................................... 33/559; 33/561; 33/558
[58] Field of Search ................. 33/559, 561, 556, 558, 33/560

[56] References Cited

U.S. PATENT DOCUMENTS

| 4,153,998 | 5/1979 | McMurtry . | |
|---|---|---|---|
| 4,187,614 | 2/1980 | Abiru et al. | 33/559 |
| 4,360,973 | 11/1982 | McMurtry | 33/561 |
| 4,462,162 | 7/1984 | McMurtry . | |
| 4,516,327 | 5/1985 | Kanda et al. | 33/559 |
| 4,661,037 | 4/1987 | Sugino et al. | 33/559 |
| 4,815,214 | 3/1989 | Enderle et al. | 33/561 |
| 4,916,825 | 4/1990 | Breyer | 33/559 |
| 4,934,065 | 6/1990 | Hajdukiewicz et al. | 33/561 |
| 5,048,194 | 9/1991 | McMurtry . | |
| 5,146,691 | 9/1992 | McMurtry | 33/559 |

FOREIGN PATENT DOCUMENTS 0390342 10/1990 European Pat. Off. .

Primary Examiner—Thomas B. Will
Attorney, Agent, or Firm—Oliff & Berridge

[57] ABSTRACT

A touch probe (10) has a housing (12) and stylus-supporting member (14) biased into a kinematic rest position relative to the housing (12) by a biasing mechanism. The biasing mechanism includes a first helical spring (40) which acts between a movable shuttle (44) and an intermediate member (48). The shuttle (44) is movable within a bore (46) and the position of the shuttle within the bore may be adjusted by the action of an adjusting screw (74). A second helical spring (42) acts between intermediate member (48) and the supporting member (14). The first spring (40) has a low spring rate and is pre-loaded such that the second spring (42), which has a high spring rate, will deflect first upon movement of the shuttle (44) or supporting member (14). Once the pre-load of spring (40) has been overcome the two springs (40,42) co-operate to act as a single spring whose spring rate is the sum of the reciprocals of the spring rates of springs (40,42). This provides adjustment of the biasing force with only a small movement of the shuttle (44) while simultaneously providing large deflections of the stylus-supporting member (14) opposed with a low rate of increase of biasing force.

7 Claims, 2 Drawing Sheets

TOUCH PROBE

BACKGROUND OF THE INVENTION

1. Field of the Invention

The invention relates to a touch probe, which is used on a coordinate positioning machine (for example a coordinate measuring machine or machine tool), to determine the position of a surface.

Such a probe comprises a fixed structure provided by a housing, by which the probe may be supported on the movable arm (e.g. a quill or spindle) of the machine. A stylus supporting member is supported in the housing in a rest position from which the supporting member may be displaced under the influence of a deflecting force, and to which the supporting member may return when the deflecting force is removed. The purpose of the supporting member is to carry a stylus. In use the machine is operated to drive the stylus into contact with a surface; the probe detects contact between the stylus and the surface, and causes a signal to be sent to the machine control which instructs the machine (a) to record the position of the movable arm at this instant, and (b) to brake movement of the movable arm. The ability of the supporting member to move from its rest position accommodates the small movement (known as overtravel) of the movable arm (and thus the probe) which occurs after the stylus has contacted the workpiece, and before the movable arm may be brought to a complete standstill. Such a touch probe may be oriented in many different ways in order to perform a measuring operation, and in order to ensure that the supporting member remains in its rest position when the stylus is not in contact with a workpiece, biasing means are provided to bias the supporting member into its rest position. The biasing means also serve to ensure that the supporting member will return to its rest position after the measuring operation in which the stylus (and thus the supporting member) has been deflected.

2. Description of Related Art

Traditionally, the biasing means has a low spring rate, to provide a small rate of increase of biasing force with displacement of the supporting member. This ensures that for large displacements of the supporting member, the biasing force will not be too large (a large biasing force can damage the stylus). The biasing means is pre-loaded to provide a sufficiently large biasing force on the supporting member when the member is in its rest position.

It is often the case that different lengths of styli will be supported on the supporting member, and that as a consequence, the force applied by the biasing means to the supporting member will need to be adjusted. A known mechanism for adjusting the biasing force on the supporting member is shown in EP 390,342, in which a spring bears against the supporting member at one end, and terminates at the other end in a cylindrical shuttle which is constrained to move within a bore provided on the fixed structure. The biasing force applied by the spring is adjusted by altering the position of the shuttle within the bore and thus the degree of compression of the spring.

SUMMARY OF THE INVENTION

A problem which occurs with this known adjustment mechanism, is that due to the low rate of the biasing means (e.g. the spring), a relatively large compression or expansion of the spring is required in order to produce a significant change in the biasing force on the supporting member, and this necessarily increases the length of the probe.

According to the present invention there is provided a touch probe for use on a coordinate positioning machine, comprising a fixed structure by which the probe may be supported on a movable arm of the machine, a stylus-supporting member supported relative to the fixed structure in a repeatable rest position from which the supporting member may be displaced under the influence of a deflecting force, and to which the supporting member may return when the deflecting force is removed, and biasing means for urging the supporting member into the said rest position, wherein said biasing means comprises a first biasing element acting between a movable abutment provided on the fixed structure and an intermediate member, and a second biasing element acting between the intermediate member and the supporting member.

Preferably the second biasing element will have a relatively high spring rate, and the first biasing element will have a relatively low spring rate and be pre-loaded between the abutment and the intermediate member such that movement of the movable abutment to adjust the biasing force results initially in compression of the second biasing element.

Because of the relatively high spring rate of the second biasing element, only a small movement of the movable abutment is required to produce a significant change in biasing force. However, a deflection of the supporting member sufficient to cause movement of the intermediate member is opposed by the combined action of the first and second biasing elements. The biasing force exerted on the supporting member is then a function of the sum of the reciprocals of the spring rates of the two biasing elements. Thus, when the first and second biasing elements are acting together, the spring rate of their combined action is smaller than that of their action individually; the biasing force on the supporting member therefore increases more slowly with increased deflection thus preventing damage to the stylus.

In one example, the abutment is provided by a shuttle movable within a bore in the fixed structure, and the position of the shuttle within the bore is adjustable (for example by means of an adjusting screw). Preferably, the first and second biasing elements will be provided by springs having differing diameters, and the intermediate member will be shaped to provide some nesting of the first and second springs, thereby reducing the overall length of the biasing means.

BRIEF DESCRIPTION OF DRAWINGS

Embodiments of the invention will now be described, by way of example, and with reference to the accompanying drawings in which.

DETAILED DESCRIPTION OF PREFERRED EMBODIMENTS

Figure 1:
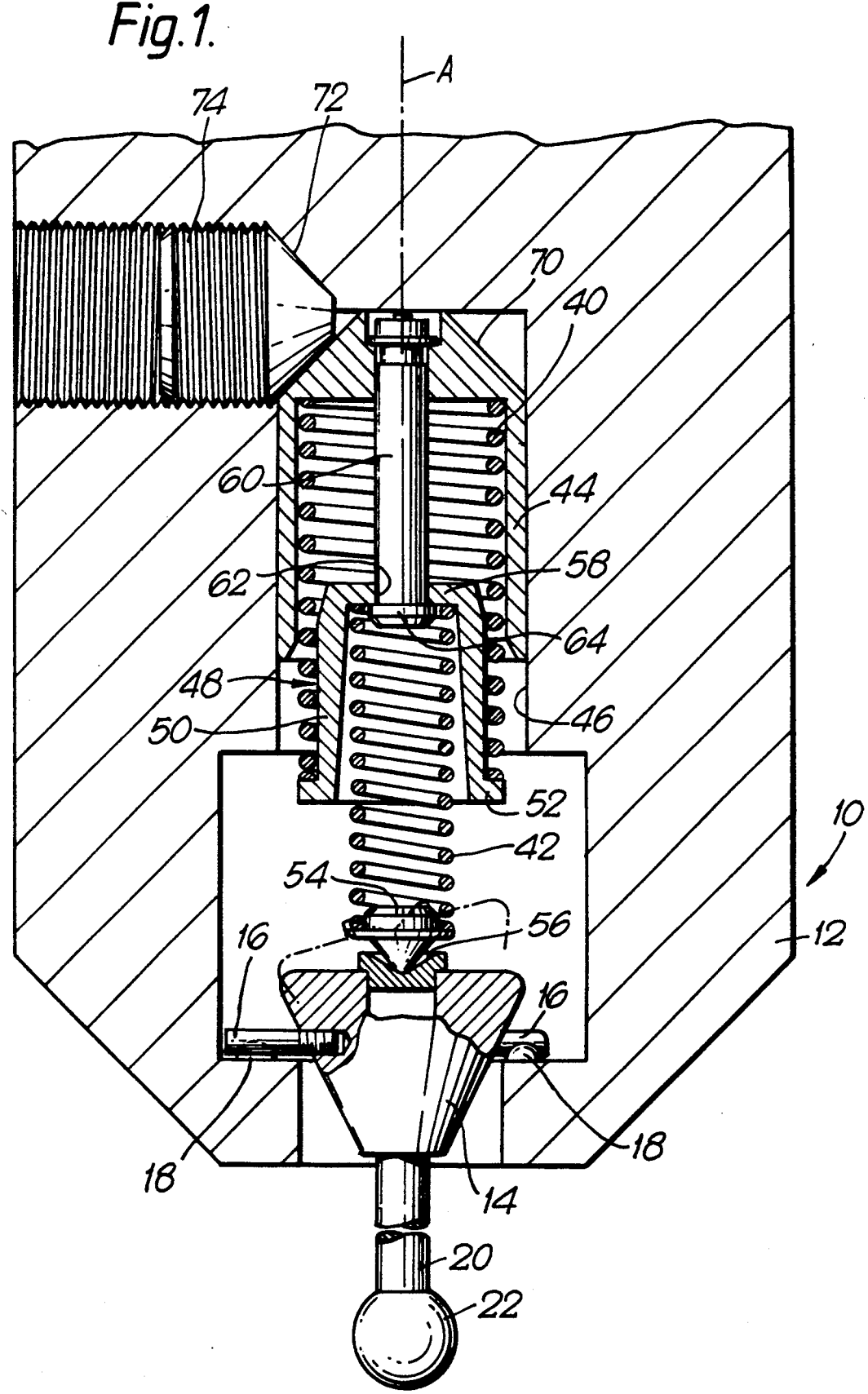
FIG. 1 shows a section through a touch probe according to the present invention.

Referring now to FIG. 1, a touch probe 10 comprises a fixed structure in the form of a cylindrical housing 12 having an axis A, and which supports a stylus supporting member 14 for movement from a kinematic rest position. The rest position of the stylus supporting member 14 is provided by three equi-spaced rollers 16 connected to the supporting member 14 which extend radially with respect to the axis A, and which each seat in the convergent surfaces defined by an adjacent pair of balls 18 supported on the housing 12. The supporting member 14 carries a stylus 20 having a spherical sensing tip 22 for contacting a workpiece surface. Contact between the sensing tip 22 and a surface is determined by detecting resistance changes in an electrical circuit comprising the serial connection of each of the rollers 16 and balls 18. Such a probe is known per se and is more fully described in our U.S. Pat. No. 4,153,998.

The stylus supporting member 14 is biased into the rest position by a biasing mechanism comprising first and second serially interconnected biasing elements in the form of helical springs which act between the housing 12 and the stylus supporting member 14. In more detail, the first biasing element is provided by helical spring 40 which bears at one end against a movable abutment, provided by a cylindrical shuttle 44; the shuttle 44 lies inside, and is movable axially along a cylindrical bore 46 provided in the housing 12. The other end of the spring 40 acts against an intermediate member 48 having a cylindrical body 50 and an outwardly depending annular flange 52 against which the spring 40 bears. The second biasing element is provided by a spring 42 which bears at one end against the supporting member 14 via a pointed pivot assembly 54; the pivot assembly engages a corresponding shaped recess 56 in the supporting member 14. The other end of the second spring 42 extends inside the cylindrical body 50 of the intermediate member 48 and bears against an inwardly depending annular flange 58. This shape of intermediate member thus provides a degree of nesting of the two springs 40,42, to enable a reduction in the overall length of the biasing mechanism.

A guide rod 60, connected at one end to the shuttle 44 extends through an aperture 62 defined by the flange 58, and a head 64, provided on the end of the rod 60 provides a stop for movement of the intermediate member 48 in an axial direction away from the shuttle 44. The guide rod thus acts to pre-load the spring 40, the length of the rod 60 determining the magnitude of the pre-load. The aperture 62 is sufficiently large relative to the rod 60 to enable easy sliding of the intermediate member 48 along the rod 60 as a result of compression of the second spring 42.

The shuttle 44 has at its end remote from the spring 40 a frusto-conical end face 70. The end face 70 abuts a corresponding frusto-conical face 72 of an adjusting bolt 74 supported in the housing 12, which extends radially with respect to the axis A. Radial movement of the adjusting bolt 74 results in axial movement of the shuttle 44 within the bore 46 and a corresponding compression or expansion of the springs 40 and 42.

In a preferred example, the first spring 40 is a relatively long spring having a relatively low spring rate, whereas the second spring 42 is a relatively short and stiff spring i.e. the spring 42 has a relatively high spring rate. The first spring 40 is pre-loaded by the stop provided by guide rod 60 such that initially, movement of the shuttle 44 to compress or expand the springs 40,42 will result only in a compression or expansion of the second spring 42. Because of the high spring rate of the second spring 42, only a small adjusting movement of the shuttle 44 is required to produce a significant change in force.

Similarly, movement of the supporting member 14 from the rest position will initially only result in a compression of the second spring 42. However, once the movement of the supporting member 14 is such that the compression of the second spring 42 is great enough to overcome the pre-load on the first spring 40, both springs will compress. This then has the effect that the springs 40 and 42 cooperate to act as a spring of much greater length than the spring 42 and having a lower spring rate than the second spring 42. Thus, once the spring 40 has been compressed, further movement of the supporting member 14 will be resisted with a smaller rate of increase in biasing force for a given displacement of the supporting member 14 than was the case prior to compression of the spring 40. This is because the combined spring rate of a pair of serially connected springs is given by the following relationship.

$$\frac{1}{R_{combined}} = \frac{1}{R_1} + \frac{1}{R_2}$$

Figure 2:
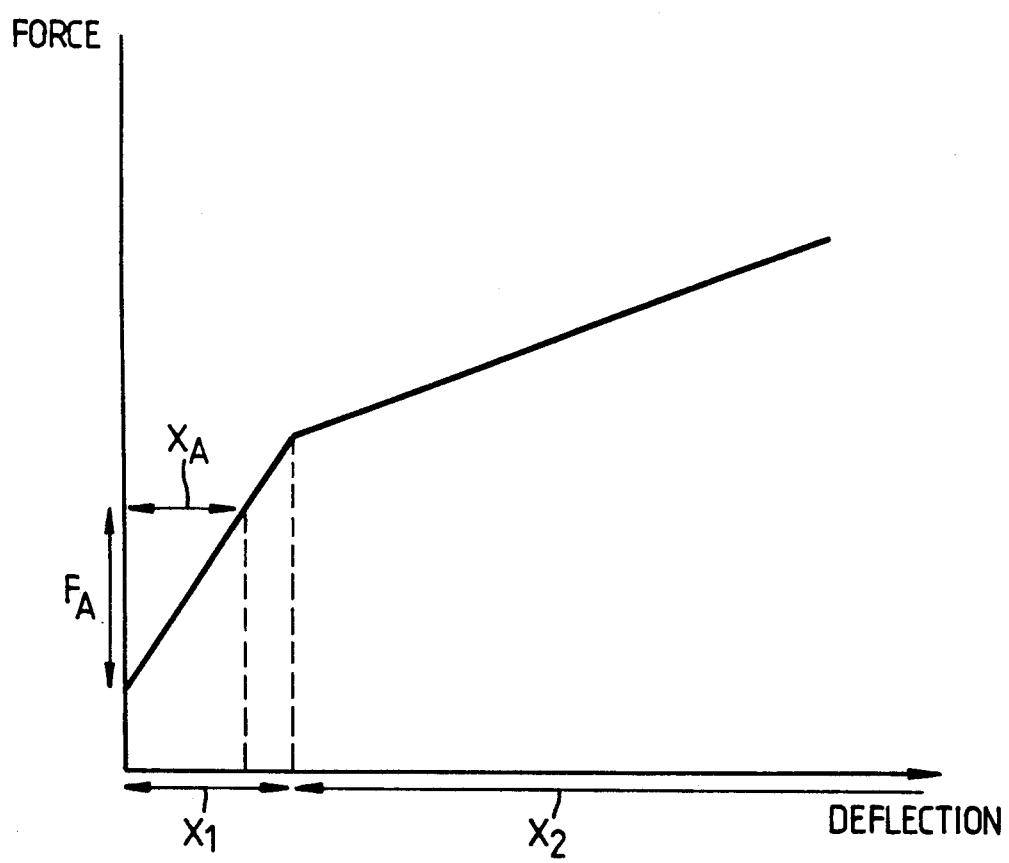
FIG. 2 shows a graph illustrating the characteristics of the biasing means according to the present invention.

Referring now to FIG. 2, it can be seen that initially displacement of the supporting member 14 prior to compression of the first spring 40 (denoted by region $X_1$) results in a greater increase in biasing force ($F_1$) per unit of displacement of supporting member 14 than is the case after compression of the spring 40 (denoted by region $X_2$). However, because adjustment of biasing force is made by altering the compression of the second spring the range of deflection required ($X_A$) to produce the required range of adjustment to the biasing force ($F_A$) is small.

I claim:

1. A touch probe for use on a coordinate positioning machine, comprising:
    a fixed structure by which the probe may be supported on a movable arm of the machine;
    a stylus-supporting member supported relative to the fixed structure in a repeatable rest position from which the supporting member may be displaced under the influence of a deflecting force and to which the supporting member may return when the deflecting force is removed; and
    biasing means for urging the supporting member into said rest position, said biasing means comprising a first biasing element acting between an abutment provided on the fixed structure and an intermediate member, and a second biasing element acting between the intermediate member and the supporting member;
    adjusting means for adjusting a biasing force provided by said biasing means on said supporting member comprising means for adjusting a distance between said abutment and said supporting member; wherein
    the intermediate member is movable relative to both the abutment and the supporting member; and
    the first and second biasing elements have different spring rates, the biasing element with the lower spring rate being pre-loaded so that adjustment of said distance initially causes a change in the load applied to the supporting member at a rate of change of force with change of said distance which corresponds to the spring rate of the biasing element having the higher spring rate.

2. A touch probe according to claim 1, wherein said abutment is movable and provided within a bore in the fixed structure, said bore having an axis extending parallel to the direction of action of said biasing means and said means for adjusting said distance includes a means for adjusting the position of said abutment within said bore.

3. A touch probe according to claim 2 wherein said means for adjusting the position of said abutment within said bore comprises an adjusting element engaging said abutment, said adjusting element being movable relative to said fixed structure in a direction transverse to the axis of the bore, wherein movement of said adjusting element causes movement of said abutment in said bore.

4. A touch probe according to claim 1 wherein said biasing elements are helical springs.

5. A touch probe according to claim 4 wherein said helical springs have different diameters and said intermediate member is shaped to provide at least a partial nesting of said helical springs.

6. A touch probe according to claim 1 further comprising stop means for compressing said biasing element with said lower spring rate, thereby to provide said pre-load.

7. A touch probe according to claim 6 wherein said first biasing element has said lower spring rate, and said stop means limits the possible separation of the intermediate member from said abutment, thereby to provide said pre-load.

* * * * *